SPROCKET PROTECTOR CIRCUIT
Filed Feb. 16, 1962
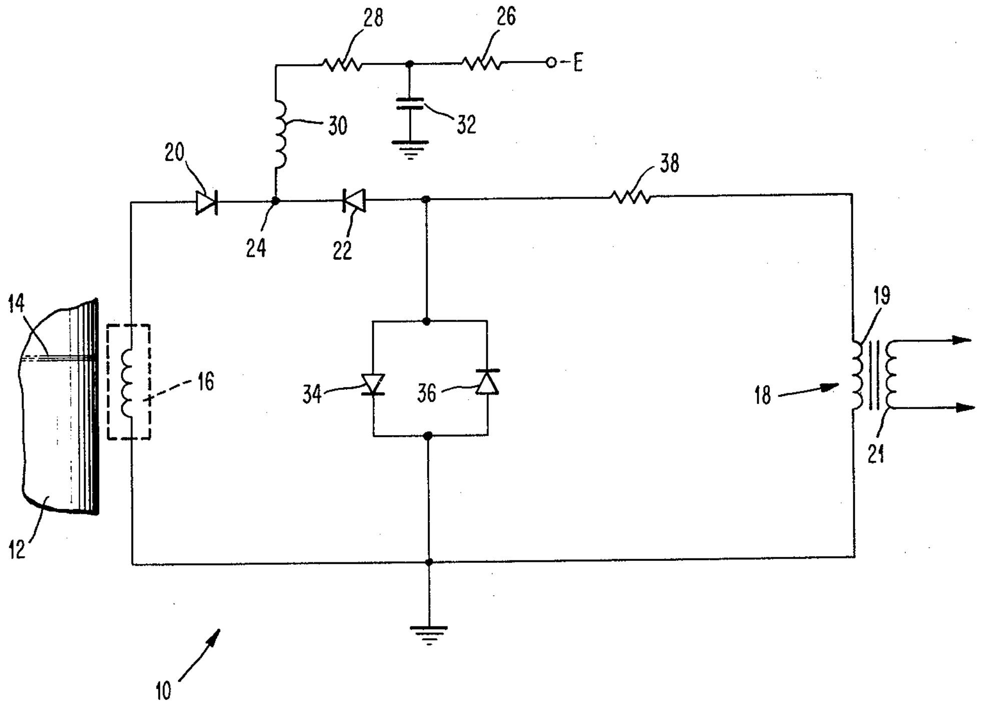
INVENTORS
WALTER DORFMAN
NORMAN J. WENIGER
BY Edward M. Farrell
ATTORNEY 3,183,517

SPROCKET PROTECTOR CIRCUIT

Walter Dorfman, Warminster, and Norman J. Weniger, Philadelphia, Pa., assignors to Sperry Rand Corporation, New York, N.Y., a corporation of Delaware Filed Feb. 16, 1962, Ser. No. 173,755
3 Claims. (Cl. 346—74)

This invention relates to a circuit for reading information from a recording medium, and more particularly to a circuit for preventing accidental erasure of signals in the recording medium.

In many magnetic systems, such as in a magnetic drum and the like, it is necessary to record timing or sprocket signals on the drum when they are manufactured at the factory and prior to shipment to individual customers. These timing signals may be considered as permanently recorded signals which are necessary for the proper operation of a computer when information is read from the drum. It is generally not feasible for an individual customer to record a timing signal after the drum is delivered since extreme accuracy of the timing signals is necessary and a customer generally lacks the precision equipment required for such recording.

One of the problems encountered in a magnetic drum involving a permanently recorded signal is that the timing signal may be accidentally erased. The main reason for this is that a reading head associated with the magnetic drum is also capable of writing information on to the drum. A transient signal fed back from a utilization circuit through the magnetic head may cause the transient signal to be written thereby causing the recorded timing signal to be erased. Such transient signals may be caused by power failure occurring in the system, by a repairman not taking proper precautions in testing the system or by various other factors.

It is an object of this invention to provide a circuit for preventing accidental erasure of a magnetically recorded signal on a recording medium.

It is a further object of this invention to provide an improved circuit for preventing spurious signals from being applied to a magnetic recording head.

It is still a further object of this invention to provide an improved circuit for preventing spurious or transient signals of different types from erasing a timing or sprocket signal on a recording medium.

In accordance with the present invention, a circuit is provided for preventing transient or spurious signals from being fed back from a utilization circuit to a recording head to thereby accidentally erase a timing signal on a recording medium. A pair of diodes are connected between the recording head and the utilization circuit. The diodes are connected in polarity opposition with respect to each other. A source of operating power is connected to the junction point of the diodes. Transient signals exceeding predetermined amplitudes cause one or the other of the diodes to become non-conductive. The particular diode which becomes non-conductive is dependent upon the polarity of the transient signals.

Other objects and advantages of the present invention will be apparent and suggest themselves to those skilled in the art, from a reading of the following specification and claims in conjunction with the accompanying single figure of the drawing.

Referring to the drawing, a protector circuit 10 is associated with a recording medium, illustrated as a magnetic drum 12. The magnetic drum includes a timing or sprocket signal, illustrated as a track 14, permanently recorded thereon. A magnetic head 16 is disposed to read out the timing signal from the magnetic drum 12. Such a magnetic head in most systems are capable of writing as well as reading information into the drum.

The read out signal after passing through the sprocket protector circuit is applied to an output transformer 18. The output transformer 18, which includes a primary winding 19 and a secondary winding 21, may be connected to a suitable utilization circuit within a computer system.

A pair of diodes 20 and 22 are connected between the head 16 and the primary winding 19 of the output transformer 18. A source of power, indicated as —E, is connected to the junction point 24 of the diodes through resistors 26, 28 and the inductor 30. A by-pass capacitor 32 is provided between the resistors 26 and 28 to compensate for supply voltage transients and for low filtering purposes.

A second pair of diodes 34 and 36 are provided across the primary winding of the output transformer 18. A balancing resistor 38, in some cases, may be connected between the anode of the diode 22 and the primary winding 19 of the output transformer 18.

During normal operations, when the timing signal 14 is being read from the recording medum 12 by the head 16, the diodes 20 and 22 are so biased that both are normally conducting. The signal read out from the drum will therefore pass through the diodes 20 and 22 to the output transformer 18.

Consider now a situation in which a transient signal is developed across the primary winding 19. This transient signal may be fed back from subsequent circuits, such as amplifiers, connected to the secondary winding 21. If the voltage developed across the primary winding 19 is negative, a negative voltage will be applied to the anode of the diode 22. The forward biasing potential of the diode 22 will therefore be reduced thereby causing the current through the diode 22 to be reduced. When the current through the diode 22 is decreased, the voltage at the junction point 24 will decrease thereby increasing the current in the diode 20. If the transient signal is of a negative polarity exceeds some predetermined amplitude, the diode 22 will become cut off. Therefore, no negative transient signal beyond a certain amplitude can be applied to the recording head 16 to erase the timing signal on the drum.

If a positive transient signal is developed at the primary winding 19 and applied to the diode 22, the diode 22 will conduct more heavily. This causes the voltage at the junction point 24 to increase in a positive direction, i.e. become less negative. This causes the current in the diode 20 to decrease. Eventually, if the transient signal is of a sufficient positive amplitude, the diode 20 will become non-conducting. Therefore, no positive transient signal exceeding a certain amplitude will be developed across the reading head 16 to erase a recorded signal on the drum 12.

Thus it is seen that the particular arrangement of the diodes 20 and 22 connected in polarity opposition affords protection for both positive and negative transient signals. At the same time, the arrangement of the diodes permits a normal reading operation of the timing signals from the recording medium 14.

The diodes 34 and 36 serve to limit the transient voltage amplitude of any signal applied to the diodes 20 and 22. The major portion of the transient voltage would then be dropped across the series balancing resistor 38 and the leakage reactance of the transformer 18, as well as the transient source impedance. Diodes 34 and 36 are chosen so that the knee of their forward conductances is somewhat above the maximum peak to peak excursions. This prevents undue additional loading of the signal source.

The diodes 34 and 36 may therefore be considered as additional protection for preventing erasing of any timing signals. An important function of the diodes 34 and 36 however, is that their use greatly reduces the peak voltage requirements of the diodes 20 and 22.

The various components in a circuit are chosen so that the current through the recording head 16 will be sufficiently low to provide protection against any erasure of the recording information. The resistors 26 and 28 are chosen high enough so that not to unduly shunt or load down the head 16 source impedance. Two separate resistors are used to permit suitable by-pass of the supply voltage by the capacitor 32. Inductor 30 may be used to provide additional filtering of the supply voltage transients and reduces the shunting effect of resistors 26 and 28 and capacitor 32 upon the signal source 16.

The voltage −E is chosen in conjunction with the resistors 26 and 28 to provide a voltage which is high enough to insure a maximum tolerable signal voltage drop across the impedance of the diodes 20 and 22. It must also be low enough to insure that it will not cause any significant change or effect to take place in the recording medium 14 disposed close to the head 16.

Balancing resistor 38 may be of a suitable value depending upon the difference in resistances of the recording head 16 and the primary winding 19. It is desirable to have an equal amount of current normally flowing through the diodes 20 and 22. The resistor 38 makes this possible. If the current through the diodes 20 and 22 were not equal, it would be difficult to predict the break down and cut off voltages of a particular diode. It is important that one diode not conduct too much more than the other diode since the maximum allowable amplitude of the transient signals must be determined in designing the circuit.

It is seen that the present invention has provided a relatively simple and inexpensive circuit for preventing accidental erasing of a timing signal on a recording medium.

In a particular embodiment of the present invention, the entire circuit illustrated was included in a single unit and physically placed adjacent to the recording medium. This arrangement eliminated lines between the protection circuit and the recording head across which a transient signal might be produced.

The circuit illustrated is single ended in nature. Here, if center tapped reading heads are used with center tapped matching transformers, the entire circuit illustrated may be duplicated. In this case, the basic operation of the circuit, as described, will remain the same.

What is claimed is:

1. A protective circuit for preventing transient signals of excessive amplitude from being fed back from a utilization circuit to a recording head to erase recorded information on a recording medium comprising a first diode connected to said recording head, a second diode between said first diode and said utilization circuit, said first and second diodes being connected in polarity opposition with respect to each other, a pair of parallel diodes connected across said utilization circuit for limiting the voltage applied to said first and second diodes from said utilization circuit, a source of power, and means for applying said power to the junction point of said first and second diodes to maintain said diodes normally conducting, one of said diodes becoming non-conductive when a signal from said utilization circuit exceeds a predetermined amplitude, the particular diode becoming non-conductive being dependent upon the polarity of said signal from said utilization circuit.

2. A protective circuit for preventing transient signals of excessive amplitude from being fed back from a utilization circuit to a recording head to erase information from a recording medium comprising a first diode connected to said recording head, a second diode between said first diode and said utilization circuit, said first and second diodes being connected in polarity opposition with respect to each other, a pair of parallel diodes connected across said utilization circuit to limit voltages of either positive or negative polarity applied to said first and second diodes from said utilization circuit, a source of power, means for applying said power to the junction point of said first and second diodes to maintain said diodes normally conducting, and a resistor connected in the current path of one of said first or second diodes to balance the current through said first and second diodes, one of said diodes becoming non-conductive when a signal from said utilization circuit exceeds a predetermined amplitude, the particular diode becoming non-conductive being dependent upon the polarity of said signal from said utilization circuit.

3. A protective circuit for preventing transient signals of excessive amplitude from being fed back from a utilization circuit to a recording head to erase recorded information on a recording medium comprising a first diode connected to said recording head, a second diode between said first diode and said utilization circuit, said first and second diodes being connected in polarity opposition with respect to each other, a circuit connected to said utilization circuit for limiting the voltage applied to said first and second diodes from said utilization circuit, a source of power, and means for applying said power to the junction point of said first and second diodes to maintain said diodes normally conducting, one of said diodes becoming non-conductive when a signal from said utilization circuit exceeds a predetermined amplitude, the particular diode becoming non-conductive being dependent upon the polarity of said signal from said utilization circuit.

References Cited by the Examiner

UNITED STATES PATENTS 2,877,451 3/59 Williams ____________ 340—174.1

IRVING L. SRAGOW, *Primary Examiner.*